United States Patent [19]

Thatcher et al.

[11] Patent Number: 5,757,998
[45] Date of Patent: May 26, 1998

[54] MULTIGIGABIT ADAPTABLE TRANSCEIVER MODULE

[75] Inventors: Raymond Jonathan Thatcher; Mark Kenneth Hoffmeyer; David Peter Gaio; Sukhvinder Singh Kang, all of Rochester, Minn.

[73] Assignee: International Business Machines Corporation, Armonk, N.Y.

[21] Appl. No.: 724,400

[22] Filed: Oct. 2, 1996

[51] Int. Cl.⁶ ............................................. G02B 6/36
[52] U.S. Cl. ................................... 385/75; 385/89
[58] Field of Search ........................... 385/75, 88–93

[56] References Cited

U.S. PATENT DOCUMENTS

| | | | |
|---|---|---|---|
| 4,543,450 | 9/1985 | Brandt | 179/2 C |
| 4,727,248 | 2/1988 | Meuer et al. | 350/96.2 |
| 4,798,440 | 1/1989 | Hoffer et al. | 350/96.2 |
| 4,802,725 | 2/1989 | Borne et al. | 350/96.2 |
| 4,853,830 | 8/1989 | Corfits et al. | 361/391 |
| 5,039,194 | 8/1991 | Block et al. | 350/96.2 |
| 5,050,041 | 9/1991 | Shafi | 361/391 |
| 5,117,476 | 5/1992 | Yingst et al. | 385/88 |
| 5,278,730 | 1/1994 | Kikinis | 361/686 |
| 5,280,191 | 1/1994 | Chang | 257/712 |
| 5,311,397 | 5/1994 | Harshberger et al. | 361/683 |
| 5,330,365 | 7/1994 | Leeson | 439/77 |
| 5,337,391 | 8/1994 | Lebby | 385/88 |
| 5,337,398 | 8/1994 | Benzoni et al. | 385/90 |
| 5,340,340 | 8/1994 | Hastings et al. | 439/924 |
| 5,375,041 | 12/1994 | McMahon | 361/749 |
| 5,416,872 | 5/1995 | Sizer, II et al. | 385/92 |
| 5,457,601 | 10/1995 | Georgopulos et al. | 361/686 |
| 5,546,281 | 8/1996 | Poplawski et al. | 361/752 |
| 5,596,665 | 1/1997 | Kurashima et al. | 385/92 |
| 5,663,526 | 9/1997 | Card et al. | 385/88 |

*Primary Examiner*—John Ngo
*Attorney, Agent, or Firm*—Birch, Stewart, Kolasch & Birch

[57] ABSTRACT

A package for containing a high speed electronic assembly has a small physical size, shielding, pluggability, and is capable of operating at multigigabit transmission rates. The package includes a module and a cover which covers at least the top of the module. An optical assembly and a circuit packaging are inserted into the module. The package, with an appropriate cover, can be removed and inserted without disturbing other packages secured on the board. The circuit packaging is electrically connected to the board through bump connectors, while the circuit packaging itself supplies a normal force for insuring the bump connectors are in contact with the board. The package is attached to the board using an attachment member which is separate from the bump connectors. The bump connectors facilitate high speed transmission. Alignment pins may be used to improve mechanical stability, provide feedback indicative of proper insertion, and to prevent bump connectors from contacting the board until the module is properly positioned. Electromagnetic interference shielding may be provided in the cover. The cover and various components of the module serve as heat sinks for the module. The cover, the pattern of the bump connectors and the positioning of the alignment pins may be selected/altered by an end user without affecting the construction of the module.

40 Claims, 10 Drawing Sheets

MULTIGIGABIT ADAPTABLE TRANSCEIVER MODULE

GOVERNMENT RIGHTS

The U.S. Government has rights in the present application pursuant to Cooperative Agreement No. F33615-94-2-1582 with the Department of the Air Force.

BACKGROUND OF THE INVENTION

1. Field of the Invention

The invention is related to a package for containing a high speed electronic module, in particular, a transceiver. The package of the present invention may have one or more of the following features: small physical size, shielding, pluggability, capable of operating at multigigabit transmission rates, and readily adaptable by an end user.

2. Background Description

Many types of electronic modules, including electro-optical converters and connectors, are described in issued patents and the technical literature. Commercial devices are also available.

Many prior art optical connectors included a serializer/deserializer on the chip. See, for example, U.S. Pat. No. 5,039,194 to Block et al., in which a optical fiber link card (OLC) is disclosed. However, the use of a serializer/deserializer occupies excess space and reduces the speed of the connection. Now that the fiber channel standard can be used within the computer itself rather than just externally, a need exists for an interconnect module that is small and fast.

One configuration that eliminates the need for a serializer/deserializer is set forth in U.S. Pat. No. 5,117,476 to Yingst et al. An optical transceiver package disclosed therein has an insertable subassembly. This allows the functional components to be assembled and tested as a sub-assembly and then readily assembled into a housing. The housing includes an outer shell, the bottom of which is attached to a circuit board. A variety of leads connect the active components to rows of posts extended along edges of the circuit substrate. These posts are soldered to the board. Thus, while the sub-assembly is initially insertable, once mounted on the board, the module is not hot pluggable, i.e., does not allow one component to be replaced without having to shut down the whole configuration.

Another configurations that eliminates the need for a serializer/deserializer is set forth in U.S. Pat. No. 5,280,191 to Chang. A packaging for use with a transceiver disclosed therein uses molded components to automatically achieve optical alignment within the package. The package further includes metallic elements the underside thereof to provide heat sinking and protection from electro-magnetic interference. An electronic subassembly includes a printed circuit board having a plurality of leads protruding from the bottom. When the package is assembled, these leads extend beyond the remainder of the package for insertion into a common board. Leads extending from optical subassemblies are directly attached to the printed circuit board.

As the number of packages which are to be attached to a board increase, there is a need for the packages to be hot pluggable, i.e., one package can be replaced without having to shut down the whole configuration. The above connectors are not hot pluggable. The pins of the above configurations are soldered into holes on the board when the device is assembled. Therefore, a package cannot be removed from the board without shutting down the entire configuration.

Further, the use of the pin and hole electrical connectors of the above described configurations limit the ability of the packages to be mounted on both sides of the board. As space requirements become increasingly stringent, and as the demands on the capabilities provided by the assembled board increase, it is desirable to be able to achieve mounting on both sides of the board. Such two sided mounting results in an efficient use of surface area of the entire board and reduces the number and/or size of the boards Another configuration which eliminates the need for a serializer/deserializer, while permitting two sided mounting, is set forth in U.S. Pat. No. 5,546,281 to Poplawski et al. A module disclosed therein uses male ribbon connectors extending from a bottom thereof which are inserted into a female ribbon connector mounted on the card. For disconnecting the module from the board, the male connector is pulled from the female connector. This configuration allows the module to be replaced quickly. The ribbon assembly allows the modules to be mounted on both sides of a board, while the pin and hole connectors noted above limited this ability. However, other problems associated with the length of the connectors themselves still remain and problems regarding the size requirements for the ribbon configuration are present.

All of the above configurations integrate the cover design and the electrical connectors. Thus, alteration of the design of components such as the circuit, the cover and the mounting on the board is difficult and, thus, is not feasibly available to an end user. Therefore, sufficient design flexibility is not available to an end user to meet the changing demands of circuit board applications.

A primary disadvantage of the above connectors for high speed applications is that, due to the length of the electrical connectors themselves, the connectors are not able to operate at a multigigabit transmission speed. Further, the use of elongated electrical connectors results in large capacitances and inductances which are very undesirable at high speed transmission and require the components to be precisely made in order to reduce these effects. Additionally, the use of elongated connectors results in loss of space, always a concern in electronic equipment. Finally, these and other problems should be overcome by providing a module which is hot pluggable and reduces the length of the electrical connections.

SUMMARY OF THE INVENTION

Therefore, it is an object of the present invention to provide a package which is small, pluggable, capable of multigigabit transmission, and adaptable by an end user.

It is further an object of the present invention to provide heat sinking and electro-magnetic interference shielding in the package.

It is another object of the present invention to provide feedback to an end user indicating that the package, the circuit therein, and the common board are properly aligned.

It is yet another object of the present invention to allow easy interchangeability of the circuits being used within the package.

It is still another object of the present invention to allow an end user to select a particular cover to be used with the module in order to accommodate different common board and system configurations.

These and other objects of the present invention may be realized by providing a package to be mounted onto a board including an electronic to optical transmitter, an optical to electronic receiver, and a bump connector for electrically connecting the package to the board. The use of a bump connector is particularly advantageous due to a reduction in size of the package itself, a decrease in the length of the electrical connection between the package and the board, and an increased data transmission rate capability.

Advantageously, the package includes an internal spring mechanism for supplying a normal force to the bump connector. A circuit packaging may be mounted on the internal spring mechanism.

Preferably, an electromagnetic interference shield surrounds the transmitter and the receiver. A thermal transfer path for active components of the package may also be provided. The transmitter and the receiver are capable of connecting to optical fibers.

The package includes a cover covering at least a top of the transmitter and the receiver. The package, either with or without the cover, is preferably hot pluggable.

Alignment pins on a bottom of the package can be used to mechanically mount the package on the board while maintaining the bump connectors off of the board until the package is properly mounted thereon.

Further, these and other objects of the present invention may be realized by providing a package including a module, an electronic assembly inserted into the module, and a circuit packaging inserted into the module. The circuit packaging includes bump connectors for electrically connecting the package to the board and provides a normal force for insuring contact between the bump connectors and the board. Advantageously, the bump connectors may be held away from contact with the board until the module is properly positioned.

The package also has an attachment mechanism, separate from the electrical connectors, for mounting the package onto a board. An array of packages may be mounted on a board, wherein the attachment mechanism allows a single package in the array to be removed external to the array. The attachment mechanism may include an extension from a bottom of the package and the board may include a depression for receiving the extension.

The circuit packaging may include a flexible circuit bonded to a resilient member which provides normal force to the bump connectors. The resilient member may be a U-shaped spring. The circuit packaging may be easily inserted into and removed from the module after the remainder of the module has been assembled. The circuit packaging may include a flexible circuit and a stiffener under the bump connectors. The stiffener may be made of metal. The circuit packaging may include thermal conductors to contact the board. The circuit packaging includes alignment pins extending from a side thereof, the alignment pins engaging with corresponding holes in the module when the circuit package is properly inserted in the module.

The electronic assembly may include leads and the circuit package may include flat connector pads for receiving the leads, thereby electrically connecting the optical assembly to the circuit package. The electronic assembly may include an optical transmitter sub-assembly and an optical receiver sub-assembly.

Alignment pins may extend from a bottom of the module, the alignment pins engaging with corresponding holes in the board when the module is properly positioned on the board.

The package preferably includes a cover covering at least a top portion of the module. The cover may be attached to the module and the package may be inserted into and removed from the board. The mounting mechanism may include grooves in the cover. Alternatively, the mounting mechanism includes tabs extending from the cover. The cover may also include electromagnetic interference shielding therein.

The above and other objects of the present invention may further be realized by providing a method for attaching a package, including a module, an electronic assembly inserted into the module and a circuit package inserted into the module to a board. The method includes the steps of electrically connecting the module to the board via bump connectors and supplying a normal force to the bump connectors via the circuit package.

The method may also include providing audible feedback when the module is correctly inserted into the cover while the cover is attached to the board. The method may also include shielding the module from electromagnetic interference.

The method may also include providing a normal force to the bump connectors. The providing of the normal force may include mounting a flexible circuit on a spring mechanism and positioning the bump connectors over the spring mechanism. The method may also include maintaining the bump connectors off of the board until insertion of the module into the board is proper.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limited to the present invention, and wherein:

FIG. 2b is an enlarged perspective view of the board contact section shown in FIG. 2a;

FIG. 6b is a perspective top view of the circuit packaging shown in FIG. 6a.

DETAILED DESCRIPTION OF THE PREFERRED EMBODIMENTS

Figure 1A:
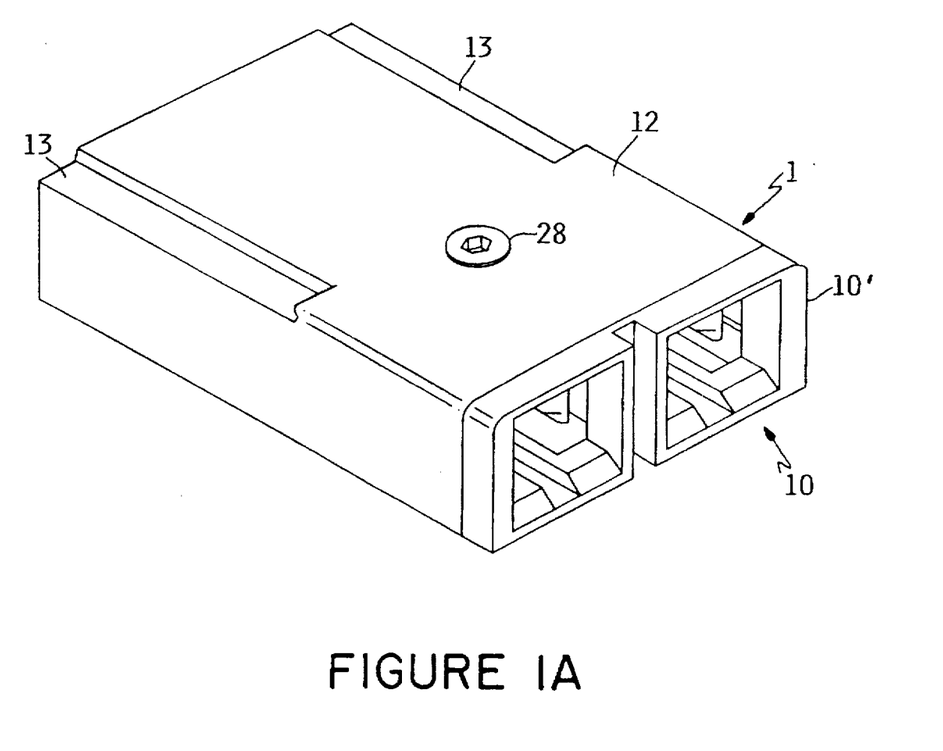
FIG. 1a is a perspective top view of a package of the present invention.
Figure 1B:
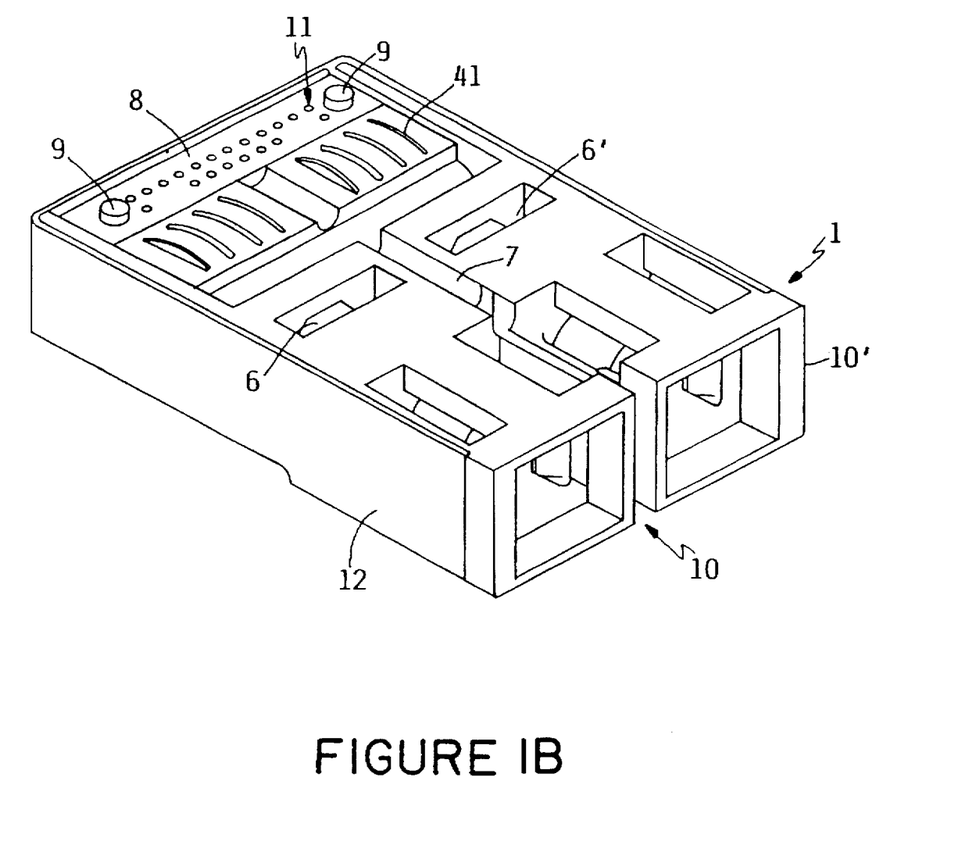
FIG. 1b is a perspective bottom view of the package of the present invention.
Figure 2A:
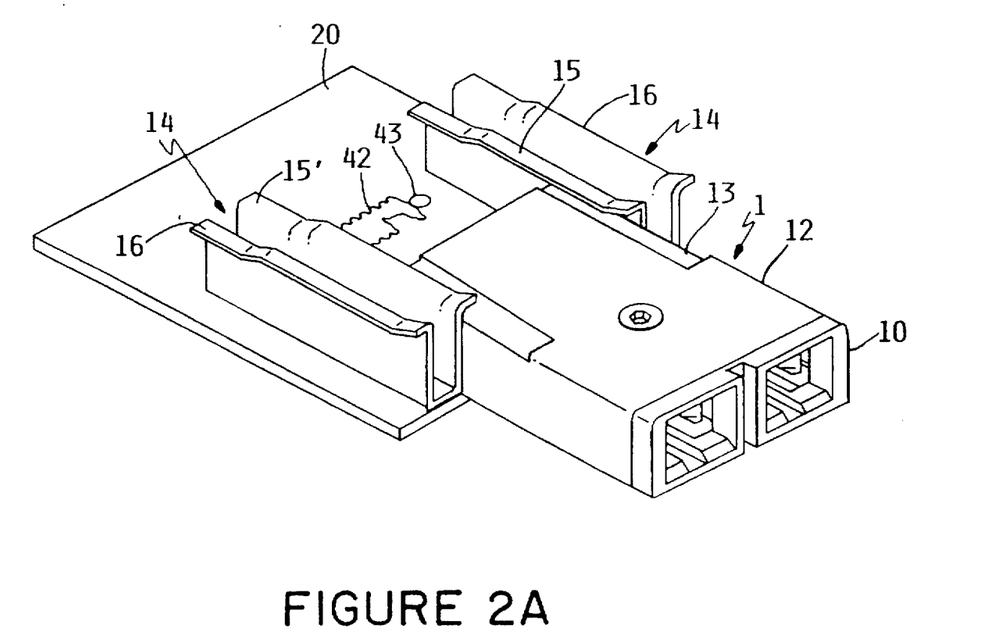
FIG. 2a is a perspective view illustrating how the package shown in FIGS. 1a and 1b may be mounted onto a board.

FIGS. 1a and 1b illustrate a package 1 generally in accordance with the present invention. The top view provided in FIG. 1a shows the package 1 which includes a module 10 covered by a cover 12. The cover 12 may have grooves 13 thereon for facilitating attachment of the package 1 to a board as shown in FIG. 2a. The cover 12 may be secured to the module 10 advantageously using a screw 28.

Figure 5:
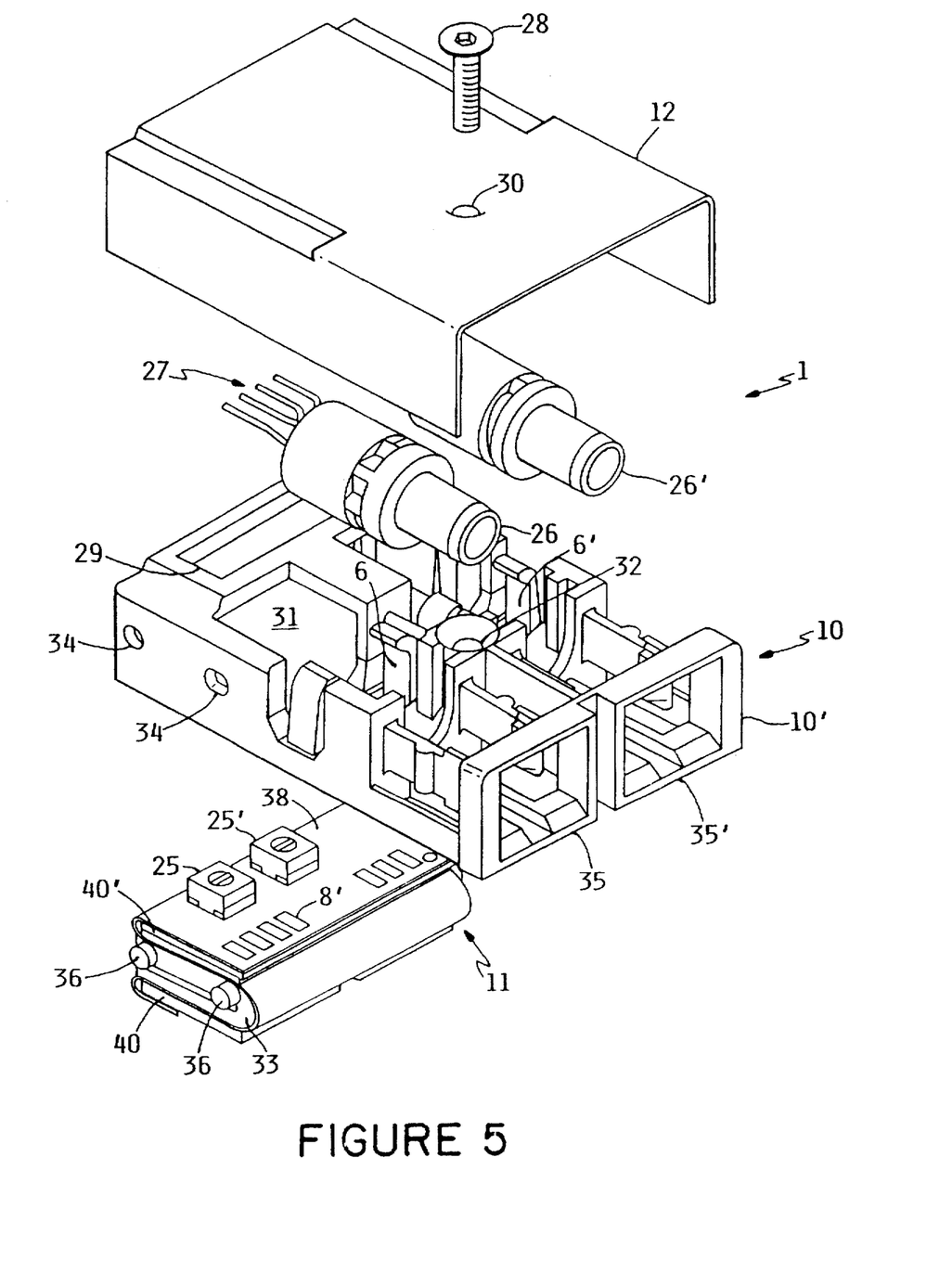
FIG. 5 is an exploded perspective view of the package.

As can be seen in the bottom view provided by FIG. 1b, the module 10 includes a module housing 10' having a compartment 6 receiving an optical assembly 26, which is shown in FIG. 5. In one preferred embodiment, two such compartments 6 and 6' and the optical transceiver assembly 26, 26' are provided in each module 10. The module housing 10' also receives a circuit packaging 11. The circuit packaging 11 includes thereon alignment pins 9 which assure proper longitudinal insertion of the package 1 into the board 20, shown in FIG. 2a, and thermal conduction pads 41, which serve as heat sinks for the module 10. In the preferred embodiment, the module 10 includes the module housing 10', the optical transceiver assemblies 26, 26', and the circuit packaging, i.e., all of the necessary components for an operational transceiver.

The module 10 also has a removal passage 7 along the center thereof. The removal passage 7 allows a tool, e.g., a screwdriver, of an appropriately small diameter to be inserted into the module 10 and to exert a force therefrom to release the alignment pins 9 from a board 20 to which it is removably attached. Other removal techniques may be employed, e.g., the technique could be integrated with the module itself.

The module 10 is electrically connected to the board 20, shown in FIG. 2a, via bump connectors 8, shown in FIG. 1b. More particularly, the bump connectors 8 electrically connect the circuit packaging 11 to the board 20.

Bump connectors

Bump connectors 8, also referred to as pad-to-pad connectors, are particularly advantageous as used in the present invention. The use of bump connectors allows electrical connections to be achieved using less metal and shorter connectors than those of previous connector configurations. These features result in decreased impedance/capacitance, while allowing faster, e.g., 4–8 gigabit, transmission prohibited by the previous connector schemes. The bump connectors also allow the module 10 to be hot pluggable, since fixed electrical connection, e.g., soldering of pins into holes, is not required.

The bump connectors 8 may be configured in any desired pattern within the two-dimensional array formed thereby. Optimal pad geometries for specific high speed signals are limited only by fabrication techniques, without increasing cost or complexity to the package design, since the package design will obviously not be affected by the design of the placement of bump connectors 8 on the flexible circuit 38, shown in FIG. 5.

Cover design and mounting

As can be seen in FIG. 2a, the package 1 is to be mounted onto a board 20. The board 20 includes mounting brackets 14 for receiving the package 1. The mounting bracket 14 has a lip 15 for grasping the cover 12. This lip 15 has an indent 15' in order to accommodate the grooves 13 in the cover 12 of the package 1. Mounting brackets 16 are available for receiving packages adjacent to the package 1. Thus, several packages 1 can be mounted at a close pitch side-by-side.

The board 20 also includes a flat connector pad 42 including conductive areas for electrically connecting the board 20 to the circuit packaging 11 of the module 10 via the bump connectors 8, shown in FIG. 1b. The board 20 also includes board alignment holes 43 for receiving the alignment pins 9 in the bottom of the module 10.

Figure 2B:
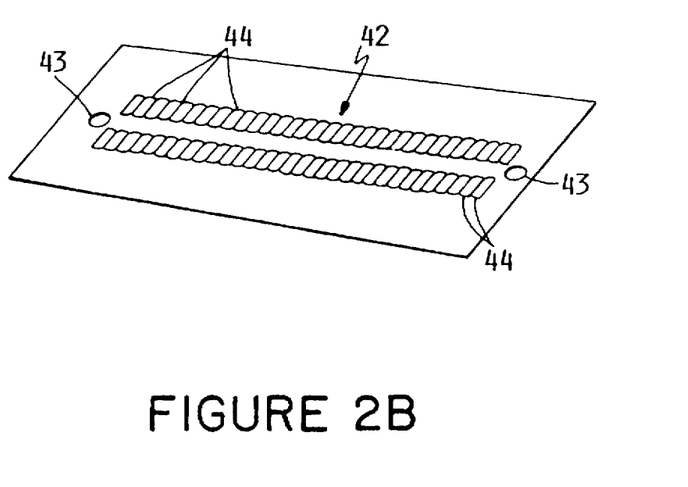

FIG. 2b is an enlarged view of the flat connector pad 42 in which the conductive regions 44 can be clearly seen.

These conductive regions 44 are available over all locations over the two-dimensional array available for positioning the bump connectors 8 so that there are no constraints on the pattern formed by the bump connectors 8. The alignment pins 9 further serve to hold the bump connectors 8 away from the conductive areas 44 of the flat connectors pad 42 until alignment is achieved.

Figure 3:
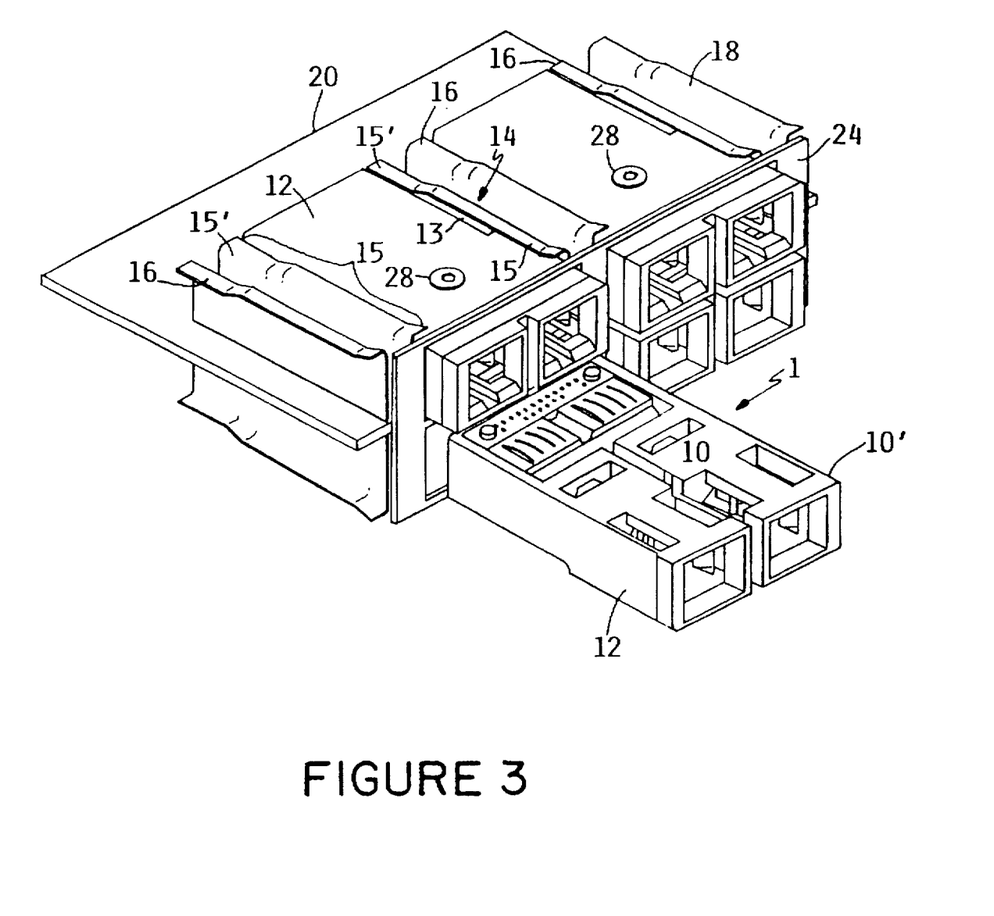
FIG. 3 is a perspective view illustrating how a number of packages as shown in FIGS. 1a and 1b may be mounted onto a board.

As can be seen in FIG. 3, when the board 20 is a double-sided board, it may be configured to receive modules 10 on either side thereof. The components shown therein are the same as those shown in FIG. 2a. It is noted that the bottoms of the modules 10 are all in contact with the board 20, therefore, the actual insertion positions of the modules 10 on the top are opposite that of the modules 10 on the bottom half. A face plate 24 may be provided on the front of the configuration.

In the board mounting configurations shown in FIGS. 2a and 3, a particular package 1 can be inserted into and removed from the board 20 without affecting the other packages. This allows the package 1 to be hot pluggable, i.e., allows one component to be replaced without having to shut down the whole configuration. This aspect of the present invention is based on the appreciation that as an increasing number of packages are to be mounted together to form a single unit, the need arises to provide optical modules that are hot pluggable, i.e., a single module can be accessed externally without affecting the remaining modules.

Figure 4:
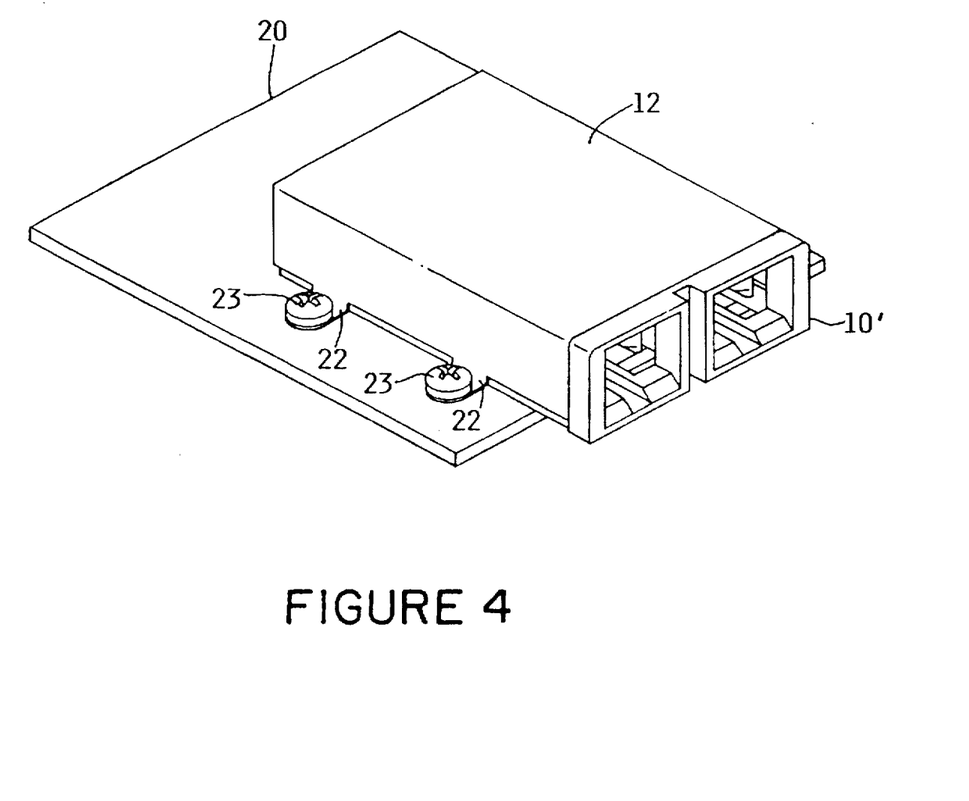
FIG. 4 is a perspective view illustrating an alternative mounting scheme for mounting the package onto a board.

However, if other considerations for the use of the module of the present invention override the convenience of hot pluggability, e.g., increased stability requirements for an intended operational environment, the package 1 may be permanently affixed to the board 20. FIG. 4 illustrates such a configuration in which the module 10 may be mounted onto the board 20, other than using the brackets 15 shown in FIGS. 2a and 3. In particular, in FIG. 4, the cover 12 includes tabs 22 having holes therethrough for receiving screws 23 for attaching the cover 12 to the board 20. Obviously, the board 20 includes holes for receiving screws 23 at appropriate locations thereon. Further, the screw 28 is not needed to fix the cover 12 to the module 10, since both are now mechanically attached to the board 20.

By designing the covers 12 independent of the module 10, an end user can customize the fastening scheme for a specific application without affecting the design or manufacture of the module 10 itself. Obviously, any number of cover configurations which provide the requisite level of stability for a given environment and the desired level of ease of access, between the extremes shown in FIGS. 2a and 3 (very easy external access), and FIG. 4 (no external access, since permanently fixed to the board) may be realized, since the cover design is independent of the module design. Such variations on the configurations would include allowing the modules 10 to be removed from a permanently affixed cover 12 shown in FIG. 4.

It is further noted that the cover 12 is not limited to covering only a single modules 10. The cover 12 could be designed to accommodate any desired number of modules 10. Also, the cover 12 may clearly be attached to the board using any attachment mechanism, such as rivets, screws, push in fasteners, slide rails, etc.

Regardless of the specific configuration of the cover 12, the cover 12 is advantageously constructed of a metal or other electrically and thermally conductive material, thereby serving as a heat sink for the components in the module 10. Further, internal electromagnetic interference (EMI) shielding may be provided either integral to or in contact with the cover 12. Advantageously, standard finger stock, for example, finger shielding of beryllium copper produced by Instrument Specialties Co., Inc., may be attached to or integral with an inner surface of the cover 12 to serve as an EMI shield. The EMI shield, in conjunction with the cover 12, serves as a heat sink for the components of the module 10.

Inner contents of the package

FIG. 5 is an exploded view of the package 1. The reference numerals used herein are the same as those used above in discussing the previous drawings. A self threading screw 28 is inserted into a cover hole 30 in the top portion of the cover 12. This screw 28 is then inserted into a module hole 32 for securing the cover 12.

As can be seen, a pair of optical assemblies 26, 26' are inserted into respective compartments 6, 6'. The optical assemblies 26, 26' may, for example, include a transmitter subassembly 26 and a receiver subassembly 26', thus formatting a transceiver. The optical assemblies 26, 26' include leads 27 for connecting them to the circuit packaging 11 via flat connector pads 8'. At an end opposite the leads 27, the optical assemblies 26, 26' may be connected with optical fibers in a conventional manner.

Each of the compartments 6, 6' include a receptacle 35, 35' for receiving connector plugs. The receptacles 35, 35' are preferably dimensioned to receive an SC duplex plug. Further, in the particular embodiment illustrated in FIG. 5, the receptacles are designed such that only a plug for sending data will be accepted by receptacle 35 and only a plug for receiving data will be accepted by receptacle 35'.

Circuit packaging

Figure 6A:
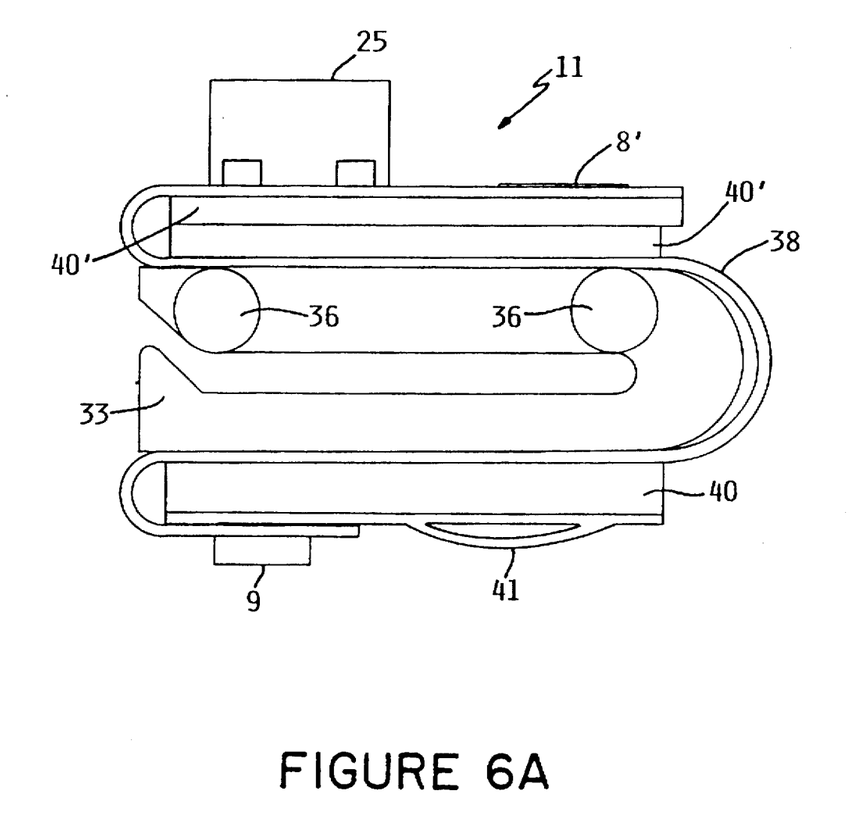
FIG. 6a is a side view of the circuit packaging.
Figure 6B:
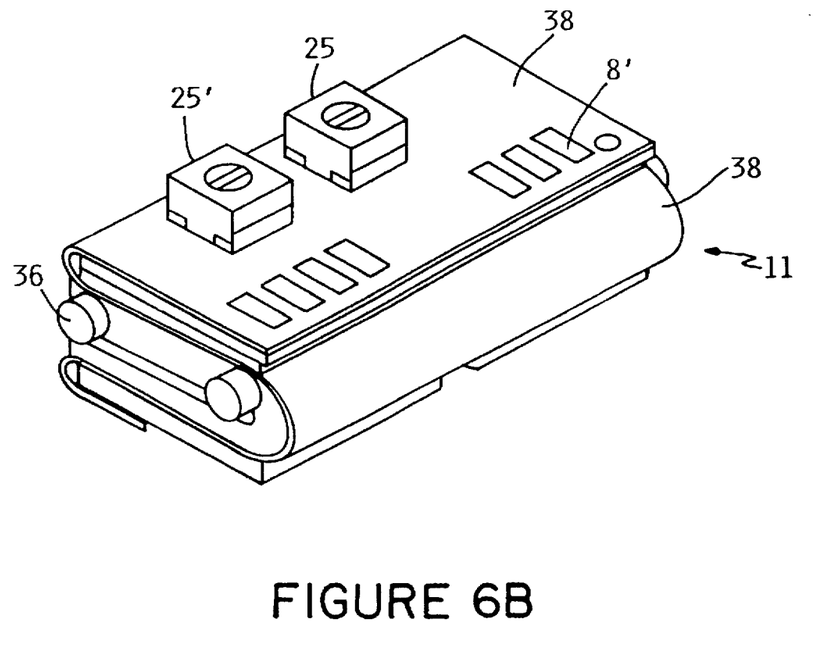
Figure 6C:
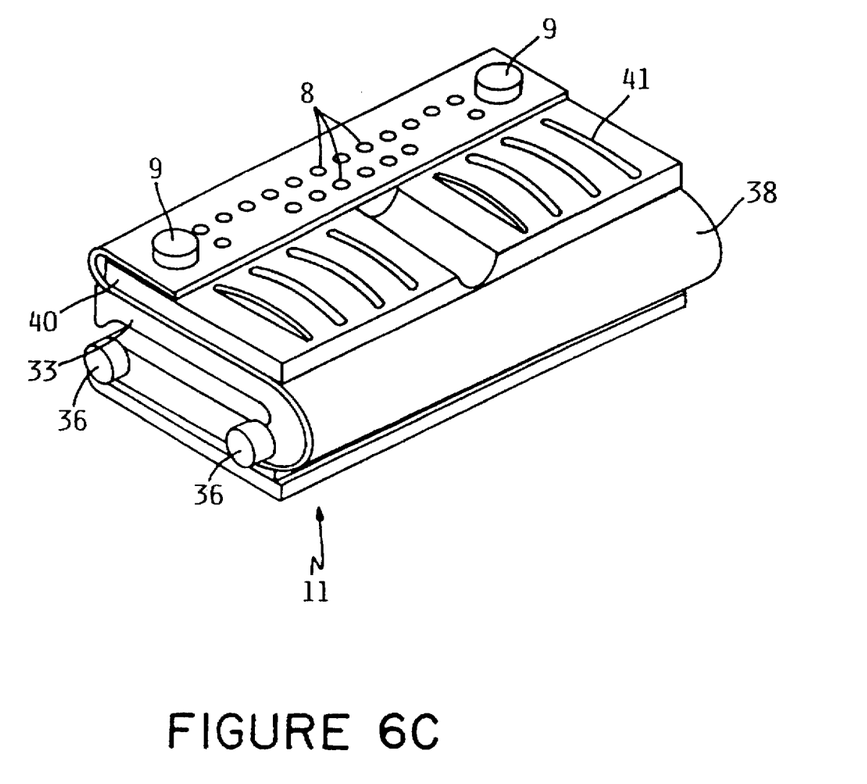
FIG. 6c is a perspective bottom view of the circuit packaging.

The circuit packaging 11 is shown in relation to the package 1 in FIG. 5, and separately, with multiple enlarged view thereof shown in FIGS. 6a–6c. The circuit packaging 11 includes a flexible circuit 38 mounted on a resilient or elastic member 33, e.g., a U-shaped spring. The resilient member 33 may be any member which is quick to recover from an application of force. Preferably, the resilient member 33 provides a normal force uniformly to the bump connector pads 8, as well as the flat connector pads 8'.

The flexible circuit 38 is to be connected to the optical assemblies 26, 26' by using flat connector pads 8', which, when the optical assemblies 26, 26' and the circuit packaging 11 are inserted in the module housing 10', are in contact with the leads 27. A pair of potentiometers 25, 25' are preferably mount to the flexible circuit 38. The potentiometers 25, 25' adjust the drive circuitry for the respective optical assemblies 26, 26'. The potentiometers 25, 25' are accessible through a receiving port 29 in the module 10. The flat connector pads 8' contact the leads 27 in a connector opening 31 in the module 10 as can be seen from FIG. 5.

Stiffeners 40, 40' may be inserted between folds of the flexible circuit 38. These stiffeners 40, 40' are preferably metal, so that they also serve as internal heat sinks. The stiffener 40 provides a physical foundation for the bump connectors 8.

As noted above, the alignment pins 9 attach the circuit packaging 11 of the module 10 to the board 20. Besides reducing mechanical tolerances due to the close proximity to the connector pads, the alignment pins 9 also keep the bump connectors, i.e., the connector pads, 8 off of the flat connector pad 42 off the board 20 until the alignment pins are inserted into the depressions 43 in the board 20. These alignment pins 9, when inserted, provide an audible feedback to the installer. In other words, the alignment pins audibly click when inserted into the depressions 43.

Simple variations in the configuration of the alignment pins 9 can be used to prevent placement of a module 10 in an inappropriate location on the board 20. Further, since alignment and attachment of the module 10 to the board 20 is achieved using the alignment pins 9 rather than the bump connectors 8 themselves, a pattern formed by the bump connectors 8 is unconstrained within the two-dimensional array formed thereby. Finally, due to the proximity of the alignment pins 9 to the bump connectors 8, mechanical tolerances are controlled.

The circuit packaging 11 integrates the mechanical assembly required to provide the normal force for the pad-to-pad connectors 8 into the module 10. In the circuit packaging 11, the flexible circuit 38 is folded, wrapped around and bonded to the resilient member 33. The resilient member 33 and the stiffener 40 provide a uniform normal force across the pad on pad connector points or bump connectors 8. The resilient member can be varied according to the required use without impacting either the externals of the package 1 or the affixing methodology selected by the end user to attach the package 1 via the cover 12 to the board 20. For example, applied normal force may easily be varied by changes to only the resilient member 33.

The circuit packaging 11 is mounted within the module housing 10' using alignment pins 36 on a side of the circuit packaging 11 and corresponding alignment holes 34 in a side of the module 10. The alignment pins 36 insure and provide audible feedback, i.e., a click when inserted to the holes 34, of proper insertion of the circuit packaging 11 into the module 10 itself.

Since different implementations of the module 10 will require different electronics and/or optics, the ability to easily replace the circuit packaging 11 within the module 10 will increase the adaptability of the module 10 by an end user. Further, simple variations in the configuration of the alignment pins 36 can be used to prevent placement of a circuit packaging 11 in an inappropriate module housing 10'. Additionally, since alignment and attachment of the circuit packaging 11 to the module housing 10' is achieved using the alignment pins 36 rather than the electrical connectors themselves, a pattern formed by the flat connectors 8' is unconstrained, and may be adapted by the end user.

The circuit packaging 11 has several advantages. The alignment pins provide an easy mechanism to perform compliance between the optics and the electronics. The use of a flexible circuit enables the electronics to be placed adjacent to the optical assemblies in all three dimensions, thereby removing constraints imposed by having the optical components and the electrical circuits in different planes. This is important to reduce radiated noise, reduce cross coupling, and to improve the quality of the multigigabit signal. The flexible circuit also provides a mechanical float between the media interface connector and the bump connectors. This reduces stress between the media cable and the package.

Conclusion

The above described package can be used with the overall dimensions being, for example, a length of 38.1 mm, a height of 10 mm and a width of 25.4 mm. These exemplary dimensions are determined in accordance with the form factor defined by the IEEE P1386 (Common Mezzanine Card) draft standard.

When all of the particular elements noted above are used in conjunction with one another, the resulting package 1 will be small, will be able to support multigigabit transmission, and the cover 12 and the circuit packaging 11, including the alignment mechanism 9 and the bump connectors 8, will be adaptable by an end user. Further, using a cover 12 which is not fixed to the board 20 will allow the package 1 to be hot pluggable. i.e.. a single package can be removed from and inserted into the board without affecting the other packages. Alternatively. if the cover 12 is to be fixed to the board 20 or when the cover 12 covers several modules 10. a module 10 itself can remain hot pluggable. i.e.. the module is insertable into and removable from the board 20 and the cover 12 without affecting the other modules.

The invention being thus described. it will be obvious that the same may be varied in many ways. Such variations are not to be regarded as a departure from the spirit and scope of the invention. and all such modifications as would be obvious to one skilled in the art are intended to be included within the scope of the following claims.

What is claimed is:

1. A package to be mounted onto a board comprising:
   an electronic to optical transmitter;
   an optical to electronic receiver; and
   a bump connector for electrically connecting the package to the board.

2. The package as recited in claim 1. further comprising an internal spring mechanism for supplying a uniform orthogonal force to said bump connector.

3. The package as recited in claim 2. further comprising a circuit packaging mounted on said internal spring mechanism.

4. The package as recited in claim 1. further comprising an electro-magnetic interference shield surrounding said transmitter and said receiver.

5. The package as recited in claim 1. further comprising a thermal transfer path for active components of the package.

6. The package as recited in claim 1. further comprising means for connecting said transmitter and said receiver to optical fibers.

7. The package as recited in claim 1. further comprising a cover covering at least a top of said transmitter and said receiver.

8. The package as recited in claim 7. wherein said package is hot pluggable.

9. The package as recited in claim 1. wherein said package is hot pluggable.

10. The package as recited in claim 1. further comprising alignment pins on a bottom of the package which mechanically mount the package on the board while maintaining said bump connectors off of the board until the package is properly mounted thereon.

11. A package comprising:
    a module including
      a module housing.
      a transceiver assembly inserted into said module housing. and a circuit packaging inserted into said module housing; and
    an attachment mechanism which attaches the package to a board. wherein said circuit packaging includes bump connectors for electrically connecting the package to the board and supplies an orthogonal force for insuring contact between said bump connectors and the board.

12. The package as recited in claim 11. further comprising a cover covering at least a top of said module. wherein said cover is attached to said module and the package may be inserted into and removed from the board.

13. The package as recited in claim 12. wherein said package. including said cover. is hot pluggable.

14. The package as recited in claim 13. wherein said circuit package includes a flexible circuit bonded to a resilient member which provides said orthogonal force to said bump connectors.

15. The package as recited in claim 14. wherein said resilient member is a U-shaped spring.

16. The package as recited in claim 11. further comprising a joining mechanism for inserting said circuit packaging into and removing said circuit packaging from said module housing after the remainder of said module has been assembled.

17. The package as recited in claim 11. wherein said transceiver assembly is an optical transceiver assembly.

18. The package as recited in claim 17. wherein said stiffener is made of metal.

19. The package as recited in claim 11. wherein said circuit packaging includes thermal conductors to contact the board.

20. The package as recited in claim 16. wherein said joining mechanism includes alignment pins extending from a side of said circuit packaging and holes in said module housing. said alignment pins engaging with corresponding holes in said module housing when said circuit packaging is properly inserted in said module housing.

21. The package as recited in claim 11. wherein said electronic assembly includes leads and said circuit packaging includes flat connector pads for receiving said leads. thereby electrically connecting said electronic assembly to said circuit packaging.

22. The package as recited in claim 11. wherein said attachment mechanism includes alignment pins extending from a bottom of said module. said alignment pins engaging with corresponding depressions in the board when the module is properly positioned on the board.

23. The package as recited in claim 11. wherein means for attaching includes grooves in said cover.

24. The package as recited in claim 11. wherein means for attaching includes tabs extending from said cover.

25. The package as recited in claim 11. further comprising electromagnetic interference shielding in said cover.

26. The package as recited in claim 11. further comprising means for keeping said bump connectors off of the board until said module is properly positioned.

27. The package as recited in claim 11. wherein said module is hot pluggable.

28. A method for mounting a package. including a module including a module housing. a transceiver assembly inserted into the module housing. and a circuit packaging inserted into the module housing. onto a board. comprising the steps of:
    electrically connecting the package to the board via bump connectors; and
    providing an orthogonal force to the bump connectors via said circuit packaging.

29. A method as recited in claim 28. further comprising providing audible feedback when said module is correctly inserted into the cover while the cover is attached to the board.

30. A method as recited in claim 28. further comprising attaching a cover covering at least a top of the module onto at least one of the module and the board.

31. A method as recited in claim 28. wherein said providing the orthogonal force includes mounting a flexible circuit on a resilient member and positioning the connectors over the resilient member.

32. A method as recited in claim 28. further comprising shielding the module from electro-magnetic interference.

33. A method as recited in claim 28. further comprising maintaining the bump connectors off of the board until insertion of the package into the board is proper.

34. A circuit packaging comprising:
   a flexible circuit;
   a resilient member on which said flexible circuit is mounted; and
   bump connectors for electrically connecting said flexible circuit to a desired unit, said resilient member supplying an orthogonal force to said bump connectors to insure connection between said bump connectors and the desired unit.

35. The circuit packaging as recited in claim 34, wherein an attachment mechanism which secures the circuit packaging a housing and the desired unit includes alignment pins extending from at least one of a side and a bottom of the circuit packaging.

36. The circuit packaging as recited in claim 34, wherein the desired unit is at least one of an module housing and a board.

37. The circuit packaging as recited in claim 35, wherein said attachment mechanism provides feedback indicating that the circuit packaging is properly attached to the desired unit.

38. An array of packages mounted on a board, wherein each package comprises:
   a module including
      a module housing,
      an electronic assembly inserted into said module housing, and
      a circuit package inserted into said module housing;
   a cover covering at least a top of said module; and
   an attachment mechanism which attaches the package to a board, wherein said circuit packaging includes bump connectors for electrically connecting the package to the board and supplies an orthogonal force for insuring contact between said bump connectors.

39. The array as recited in claim 38, wherein said attachment mechanism allows a single package in the array to be removed external to the array.

40. The array as recited in claim 38, wherein said attachment mechanism includes an extension from a bottom of the package and the board includes a depression for receiving said extension.

* * * * *